(12) United States Patent
Yamazaki et al.

(10) Patent No.: US 7,432,471 B2
(45) Date of Patent: Oct. 7, 2008

(54) LASER BEAM HARDENING TOOL

(75) Inventors: Tsunehiko Yamazaki, Aichi-ken (JP); Naoomi Miyagawa, Gifu-ken (JP)

(73) Assignee: Yamazaki Mazak Kabushiki Kaisha, Aichi-Ken (JP)

( * ) Notice: Subject to any disclaimer, the term of this patent is extended or adjusted under 35 U.S.C. 154(b) by 585 days.

(21) Appl. No.: 11/098,076

(22) Filed: Apr. 4, 2005

(65) Prior Publication Data

US 2005/0263505 A1 Dec. 1, 2005

(30) Foreign Application Priority Data

May 28, 2004 (JP) .............................. 2004-159099

(51) Int. Cl.
B23K 26/00 (2006.01)
(52) U.S. Cl. .............................. 219/121.6; 219/121.73; 219/121.74
(58) Field of Classification Search .. 219/121.6–121.72
See application file for complete search history.

(56) References Cited

U.S. PATENT DOCUMENTS

| | | | | |
|---|---|---|---|---|
| 4,577,082 A | * | 3/1986 | Inoue | 219/69.14 |
| 4,794,222 A | * | 12/1988 | Funayama et al. | 219/121.78 |
| 4,826,431 A | * | 5/1989 | Fujimura et al. | 433/29 |
| 5,376,061 A | | 12/1994 | Suzuki et al. | |
| 5,508,490 A | | 4/1996 | Klosj et al. | |
| 5,589,089 A | * | 12/1996 | Uesugi | 219/121.6 |
| 6,459,068 B1 | * | 10/2002 | Yamaura et al. | 219/121.6 |
| 2002/0153358 A1 | | 10/2002 | Inoue et al. | |

FOREIGN PATENT DOCUMENTS

| | | |
|---|---|---|
| DE | 19811032 A1 | 12/2000 |
| DE | 10126165 A1 | 10/2002 |
| EP | 1568438 A1 | 8/2005 |
| JP | 61164738 | 7/1986 |
| JP | 363215392 A * | 9/1988 |
| JP | 401241390 A * | 9/1989 |
| JP | 402272470 A * | 11/1990 |
| JP | 11312831 A * | 11/1991 |
| JP | 403254165 A * | 11/1991 |
| JP | 04293715 | 10/1992 |
| JP | 07328879 | 12/1995 |
| JP | 410249572 A * | 9/1998 |
| JP | H11-077467 | 3/1999 |
| JP | 02001071169 A * | 3/2001 |
| JP | 2002-289016 | 10/2002 |
| JP | 2003-075658 | 3/2003 |
| JP | 2003-100123 | 4/2003 |

OTHER PUBLICATIONS

Derwent acc No. 1991-337348, week 199146, Fibre optic module interface attachment- has self closing shutters to guard against accidental laser exposure, pub date Oct. 10, 1991, 2 sheets.*

* cited by examiner

Primary Examiner—Samuel M Heinrich
(74) Attorney, Agent, or Firm—Duane Morris LLP

(57) ABSTRACT

A laser beam hardening tool is comprised of an engagement portion for freely engaging with a tool holding portion of a machine tool, a beam guide path which is a passage of supplied laser beam, and a torch portion for radiating laser beam which passed through the beam guide path on a workpiece, thereby executing hardening with laser beam inside the machine tool by installing the laser beam hardening tool in the tool holding portion of the machine tool.

10 Claims, 15 Drawing Sheets

FIG.8
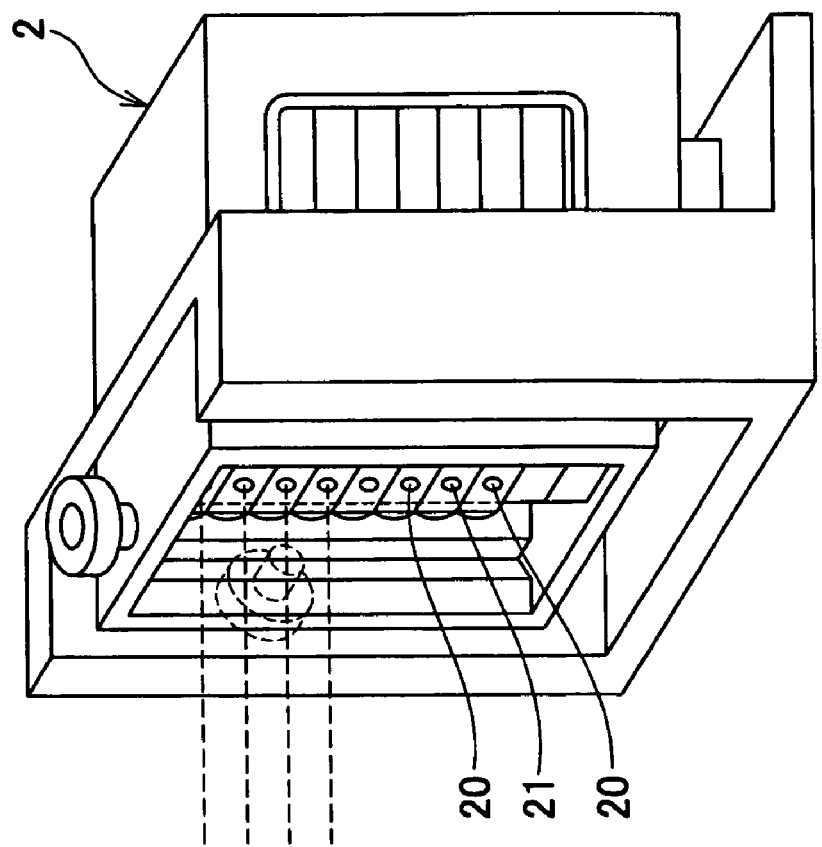
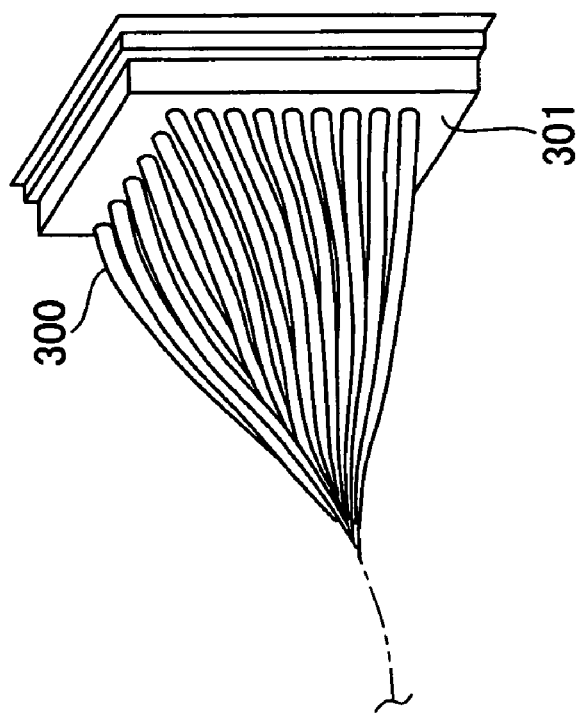

FIG.10
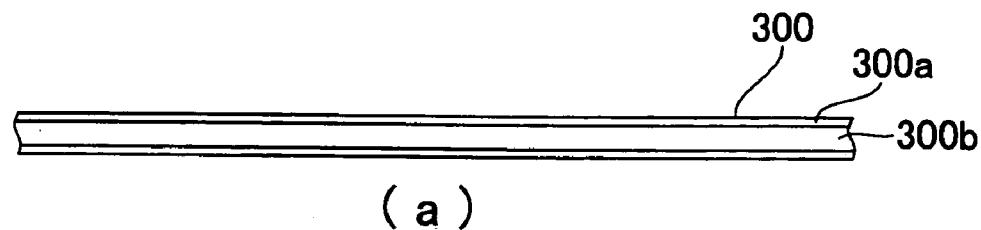
(a)
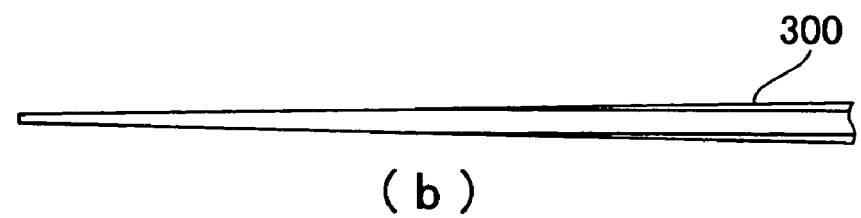
(b)
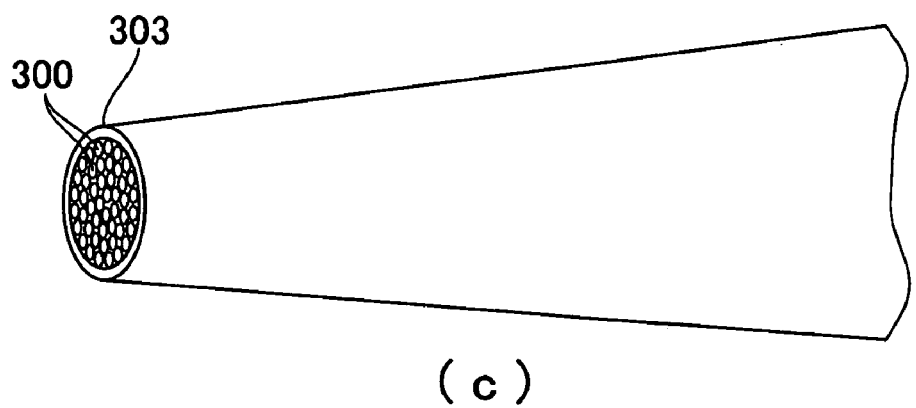
(c)

LASER BEAM HARDENING TOOL

BACKGROUND OF THE INVENTION

The invention relates to a laser beam hardening tool formed so as to be freely attached to and detached from a tool holding portion of a machine tool.

A machine tool capable of exchanging tools has been used, and various kinds of machining have been executed with such a machine tool (see Japanese patent application (Publication No. H11-77467).

Both mechanical machining and hardening with laser beam on a surface of a workpiece are desired to be performed with such a machine tool, but a machine tool having a proper structure has not been proposed.

An object of the invention is to provide a laser beam hardening tool formed so as to be freely attached to and freely detached from a tool holding portion of a machine tool.

SUMMARY OF THE INVENTION

One aspect of the invention is a laser beam hardening tool, comprising:
- an engagement portion capable of engaging with a tool holding portion of a machine tool;
- a beam guide path which is a path of supplied laser beam; and
- a torch portion for radiating laser beam which passed through said beam guide path on a workpiece.

According to this aspect of the invention, hardening with laser beam is possible with the machine tool.

Another aspect of the invention is the laser beam hardening tool, wherein an end portion of said beam guide path through which laser beam is supplied is located at a position offset with respect to an axis of said engagement portion.

According to this aspect of the invention, it is possible to avoid the interruption between the optical path for supplying the beam guide path with laser beam (beam guiding portion) and the tool holding portion.

Another aspect of the invention is the laser beam hardening tool, wherein said beam guide path is comprised of a beam guiding body an outer peripheral face of which is processed so as to reflect, and said laser beam is transmitted in said beam guiding body being reflected by said outer peripheral face.

According to this aspect of the invention, the optical position of laser beam can be easily adjusted only by changing the position of the beam guiding body.

Another aspect of the invention is the laser beam hardening tool, wherein said beam guide path is a hollow passage which is formed inside a predetermined member, having an inner face processed so as to reflect, and said laser beam is transmitted in said hollow passage being reflected by said inner face.

According to this aspect of the invention, the accuracy of the position of the beam guide path can be enhanced.

Another aspect of the invention is the laser beam hardening tool, further comprising shutter means for allowing laser beam to be supplied by opening said end portion of said beam guide path when engaging said engagement portion with said tool holding portion and for restricting attachment of foreign objects to said end portion by closing said end portion of said beam guide path when not engaging said engagement portion with said tool holding portion.

According to this aspect of the invention, attachment of foreign objects to the end portion of the beam guide path can be restricted, thereby avoiding power down of laser beam due to the presence of foreign objects in the beam guide path.

Another aspect of the invention is the laser beam hardening tool, wherein said shutter means is comprised of a shutter member movable to a closed position for closing said end portion of said beam guide path and an opened position for opening said end portion, and a spring member for energizing said shutter member to said closed position, and said shutter member is moved to said opened position against said spring member when engaging said engagement portion with said tool holding portion and is moved to said closed position by an energizing force of said spring member when detaching said engagement portion from said tool holding portion.

According to this aspect of the invention, the shutter member can be freely moved according to installation/detachment of the laser beam hardening tool, so that an operation for moving the member is not necessary, thereby avoiding an error operation and never failing to operate.

Another aspect of the invention is the laser beam hardening tool, wherein a cooling path where fluid flows is formed near said beam guide path.

According to this aspect of the invention, heat to be generated due to passage of laser beam can be restricted.

Another aspect of the invention is the laser beam hardening tool, wherein said fluid is gas, said cooling path is opened at a position facing said workpiece, and said laser beam hardening tool radiates said laser beam and expels gas onto said workpiece.

According to this aspect of the invention, it is possible to remove foreign objects on a surface of the workpiece, and to cool the workpiece. If inert gas is used as gas, it is possible to shield a portion hardened.

Another aspect of the invention is the laser beam hardening tool, wherein said beam guide path is bent on a side before reaching said torch portion, and has a corner portion, and a mirror is located at said corner portion so as to collect said laser beam reflected by said mirror and to radiate said collected laser beam on said workpiece.

According to this aspect of the invention, laser beam can be radiated on the workpiece by collecting laser beam by the mirror.

Another aspect of the invention is the laser beam hardening tool, wherein said mirror is a plane mirror or a concave mirror.

According to this aspect of the invention, the power density of laser beam can be raised by the mirror having the most proper shape.

Another aspect of the invention is the laser beam hardening tool, wherein said beam guide path is bent on a side before reaching said torch portion, and has a corner portion, and a wall face of said corner portion functions as a mirror, and said laser beam reflected by said mirror is collected and is radiated on said workpiece.

According to this aspect of the invention, laser beam can be radiated on the workpiece by collecting laser beam with the mirror.

Another aspect of the invention is the laser beam hardening tool, wherein said mirror is a plane mirror or a concave mirror.

According to this aspect of the invention, the power density of laser beam can be raised by the mirror having the most proper shape.

Another aspect of the invention is the laser beam hardening tool, wherein a path of said laser beam in said torch portion is tapered so as to have gradually reduced cross section.

According to this aspect of the invention, laser beam the power density of which was raised can be radiated on the workpiece by the tapered path.

BRIEF DESCRIPTION OF THE DRAWINGS

FIG. 8 is a perspective view showing appearances of a semiconductor laser beam source.

FIG. 10 is a view showing a structure of a taper beam path portion.

DESCRIPTION OF THE PREFERRED EMBODIMENTS

Figure 2:
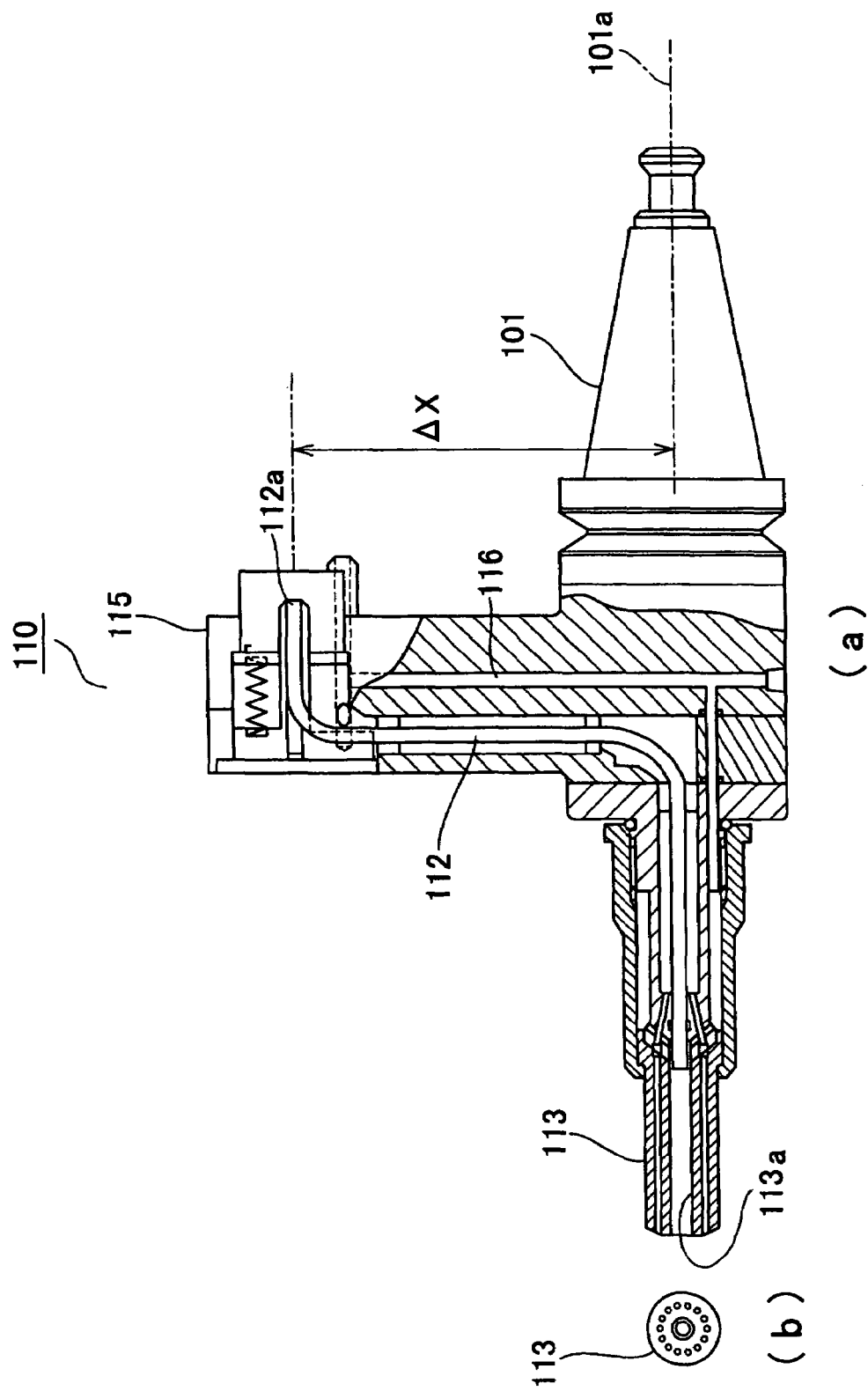
FIG. 2(a) is a partial sectional view showing a structure of another laser beam hardening tool according to the invention.
FIG. 2(b) is a side view showing a structure of a torch portion 113.
Figure 3:
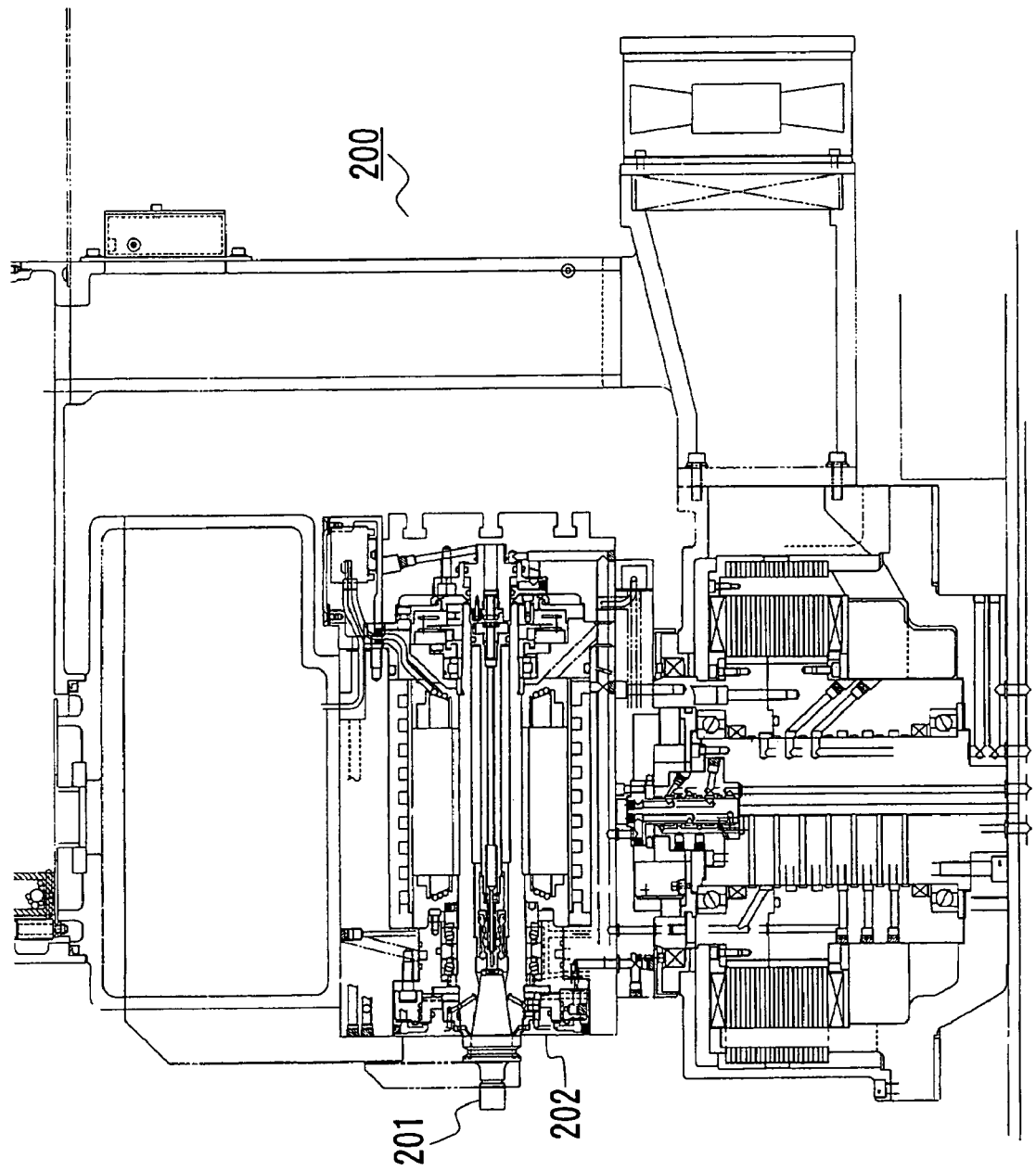
FIG. 3 is a sectional view showing a structure of a machine tool installing the laser beam hardening tool according to the invention therein.
Figure 4:
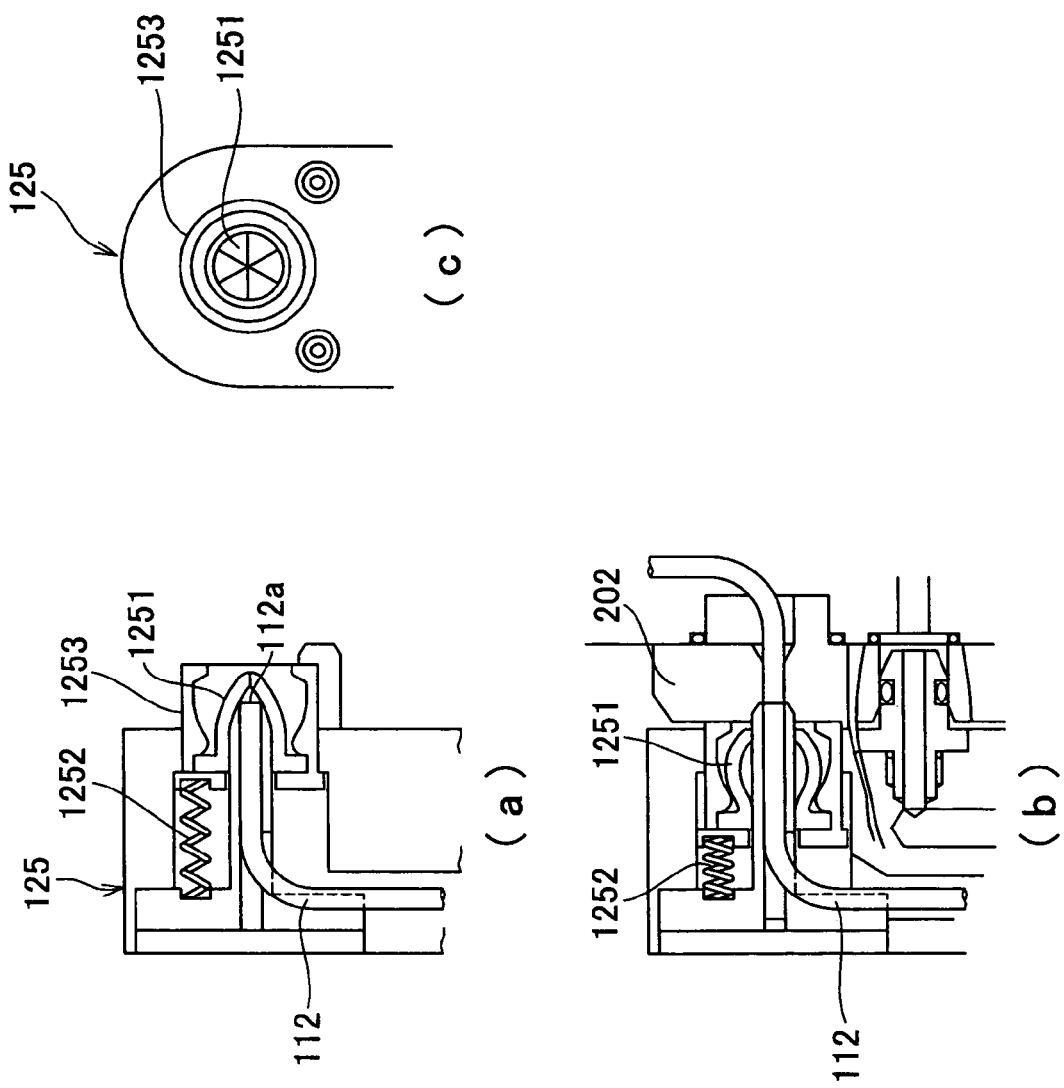
FIG. 4 is a view showing a structure of shutter means for properly closing an end portion of a beam guide path (a path of laser beam) wherein (a) is a sectional view showing a state of a closed position, (b) is a sectional view showing a state of an opened position, and (c) is a side view showing a state of the closed position.
Figure 5:
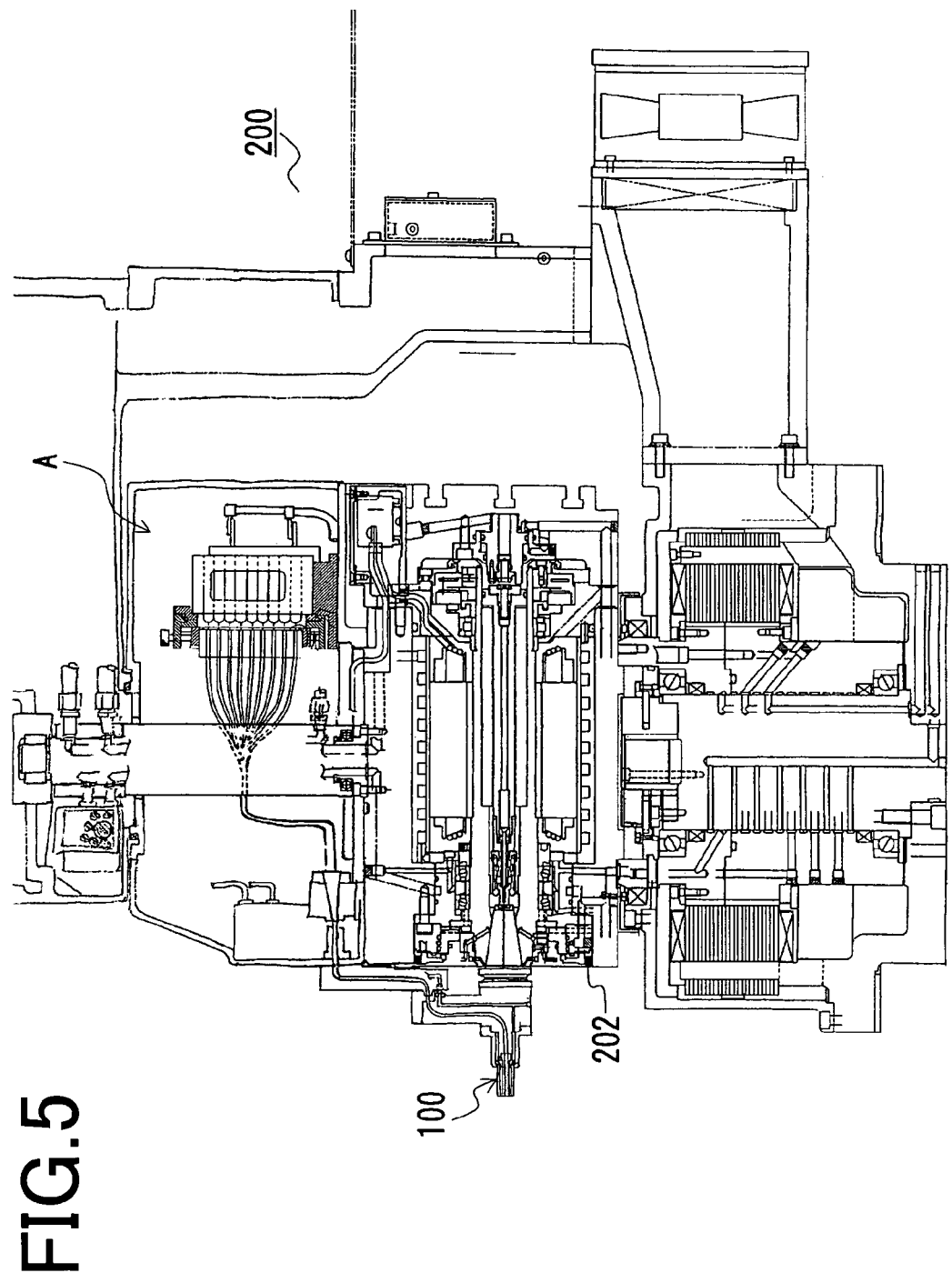
FIG. 5 is a sectional view showing a structure of the machine tool installing the laser beam hardening tool therein.

FIG. 1(a) is a partial sectional view showing a structure of a laser beam hardening tool according to the invention, FIG. 1(b) is a side view showing a structure of a torch portion 103, and FIG. 1(c) is a side view showing a structure of a shutter means 105, FIG. 2(a) is a partial sectional view showing a structure of another laser beam hardening tool according to the invention, FIG. 2(b) is a side view showing a structure of a torch portion 113, FIG. 3 is a sectional view showing a structure of a machine tool installing the laser beam hardening tool according to the invention therein, FIG. 4 is a view showing a structure of the shutter means for properly closing an end portion of a beam guide path (a path of laser beam) wherein (a) is a sectional view showing a state of a closed position, (b) is a sectional view showing a state of an opened position, and (c) is a side view showing a state of the closed position, and FIG. 5 is a sectional view showing a structure of the machine tool installing the laser beam hardening tool therein.

A laser beam hardening tool 100 according to the invention is installed in a machine tool 200 as shown in FIG. 3 in place of a tool for machining 201 which is installed in a tool holding portion 202, such as a tool rest when executing hardening with laser beam. Preferably, the tool is attached and detached with an ATC (Automatic tool changer).

The laser beam hardening tool according to the invention has a shape as shown in FIG. 1(a), and has an engagement portion 101 for engaging with the tool holding portion 202 of the machine tool 200, a beam guide path 102 which is a passage of supplied laser beam, and a torch portion 103 for radiating laser beam which passed through the beam guide path 102 on a workpiece W. If such laser beam hardening tool is used, hardening with laser beam can be executed in the machine tool 200 in addition to mechanical machining. Preferably, the engagement portion 101 has an almost conical shape (the section is a circle) a center of which is an axial 101a, and has a stopper portion at its end portion 101b.

The beam guide path 102 as shown in FIG. 1(a) is a hollow path which is formed inside a predetermined member 104, and an inner face thereof is processed so as to reflect, so that laser beam can be transmitted inside the hollow path being reflected by the inner face. The processing of reflecting is lapping, mirror finish, or coating with gold or silver. The member 104 may be made of metal, such as aluminium. A method of forming the hollow path is that the member 104 is divided into a plurality of members, and a groove is formed at a mating face. If the member 104 is divided into a plurality of members, it is necessary that beam does not escape from a gap of the mating face. If the beam guide path is the hollow path 102, the beam guide path can be formed by mechanical machining, and an accuracy of the position of the beam guide path can be improved.

The beam guide path may be comprised of a beam guiding body 112 having an outer peripheral face processed so as to reflect, as shown in FIG. 2(a), not be comprised of the hollow path. In this case, laser beam passes through the beam guiding body 112, being reflected by the outer peripheral face. The processing to reflect is coating with gold or silver, for instance. The beam guiding body 112 is a glass, for instance. When forming the beam guide path with the beam guiding body 112, the position of the optical path of laser beam can be easily adjusted only by change of a position of the beam guiding body 112.

Figure 14:
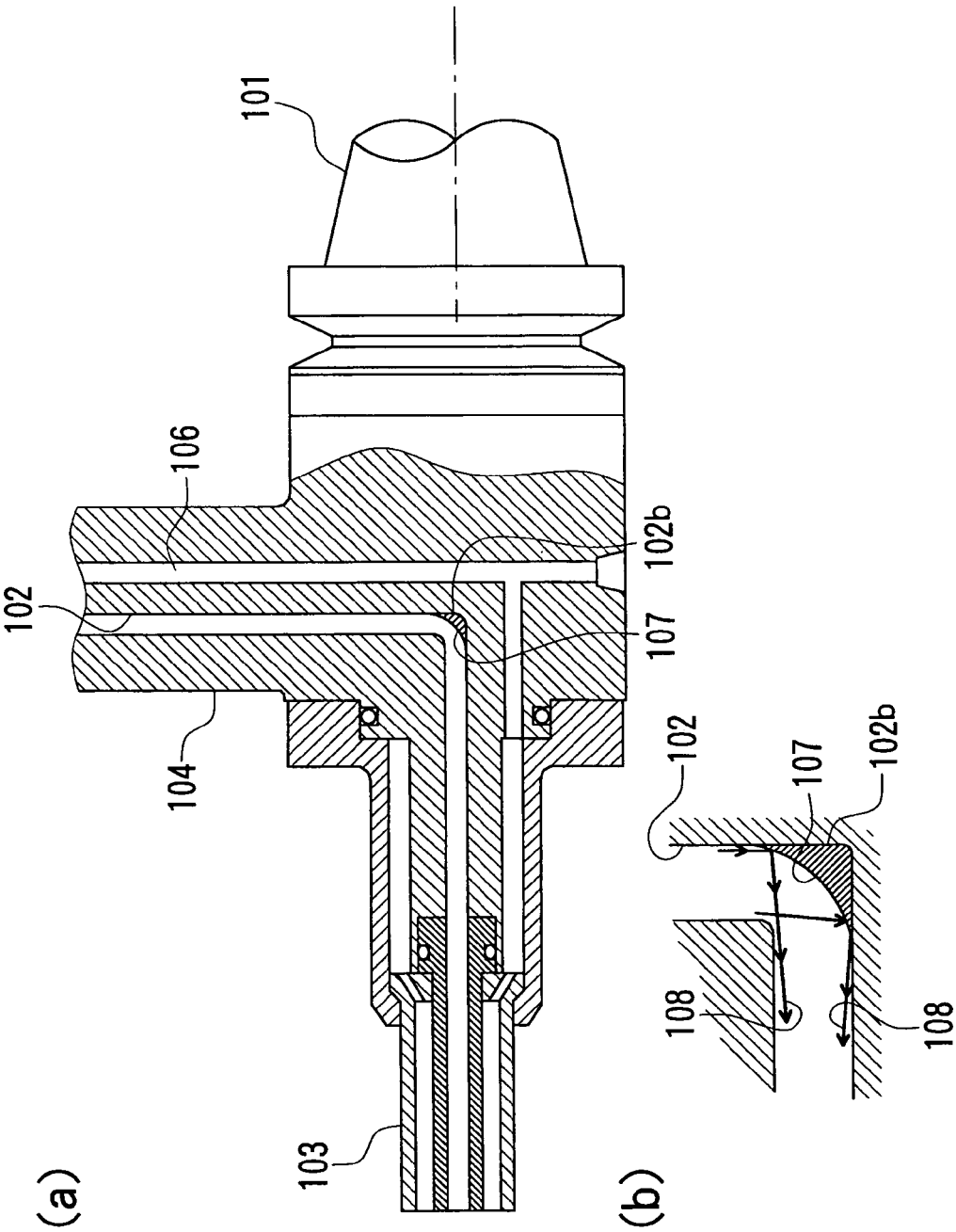
FIG. 14(a) is a partial sectional view showing a structure of another laser beam hardening tool according to the invention.
FIG. 14(b) is a sectional view showing laser beam reflected by a mirror 107 which is located at a corner portion of a beam guide path 102 in detail.
Figure 15:
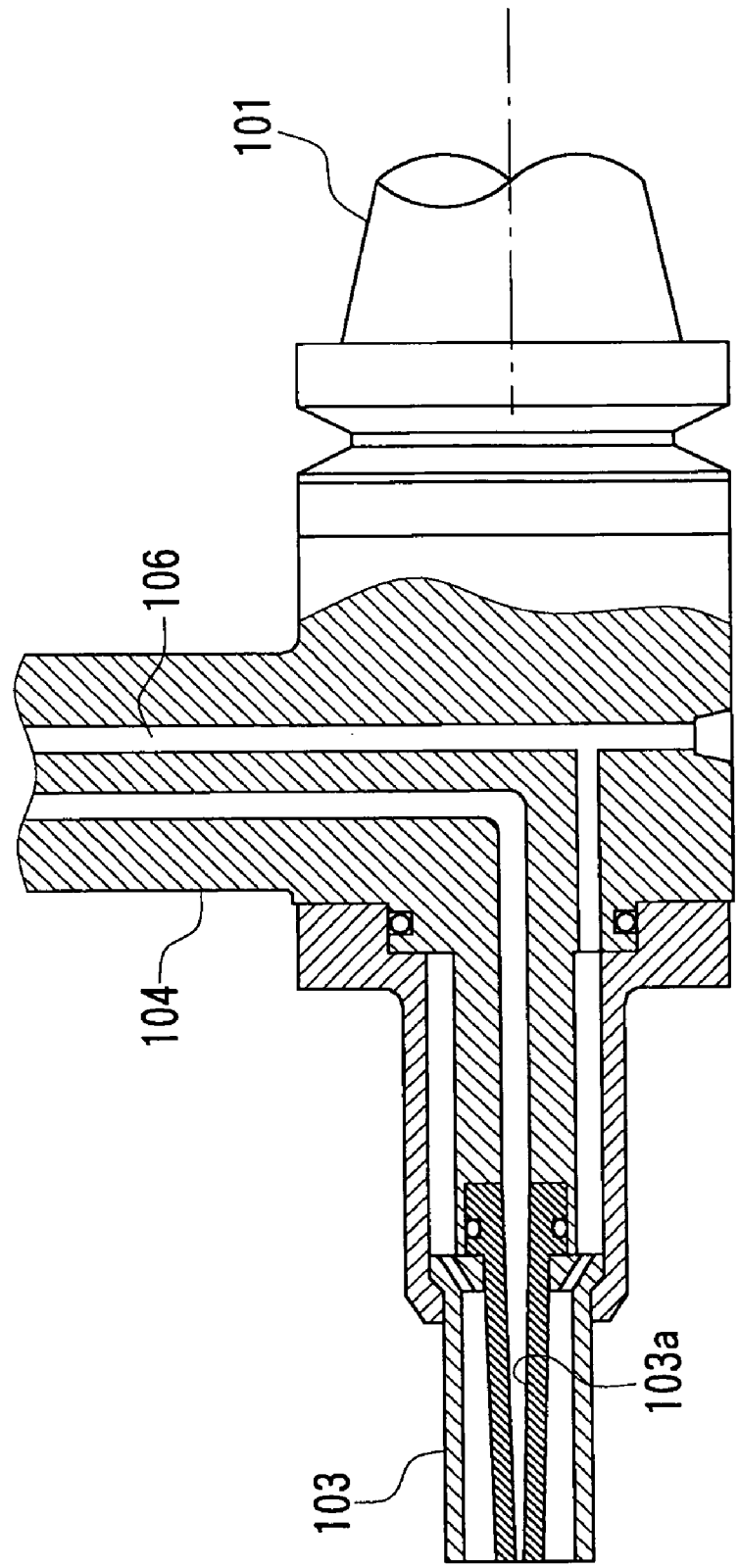
FIG. 15 is a partial sectional view showing a structure of another laser beam hardening tool according to the invention.

The guide beam paths 102, 112 and/or the torch portions 103, 113 may be formed so that a cross section of laser beam (area of cross section) is gradually reduced in order to radiate laser beam power density of which is raised on a workpiece W. Preferably, in order to gradually reduce the cross sectional area of laser beam in the hollow beam guide path 102, a corner portion 102b is formed by bending the beam guide path 102 on a side before reaching the torch portion 103 (an upstream side in a laser beam radiating direction, that is, right side in the figure), as shown in FIG. 14(a), (b), and a mirror 107 is located at the corner portion 102b so as to collect laser beam 108 which is reflected by the mirror 107 and to radiate the collected laser beam 108 on the workpiece W. In addition, in order to gradually reduce the cross sectional area of laser beam in the torch portions 103, 113, preferably, a path of laser beam in the torch portion is tapered so as to have the cross sectional area which is gradually reduced, as shown in FIG. 15. Preferably, the mirror 107 is formed in such a manner that the member 104 (the corner portion 102b of the beam guide path 102) is directly scraped so as to form a curved surface functioning as a mirror, and the curved surface is processed so as to reflect (that is, the wall face of the corner portion 102b may function as a mirror), and is located. In this case, the mirror 107 and the member 104 are comprised of physically the same member. The mirror 107 may be a concave mirror as shown in FIG. 14 or a plane mirror.

Figure 1:
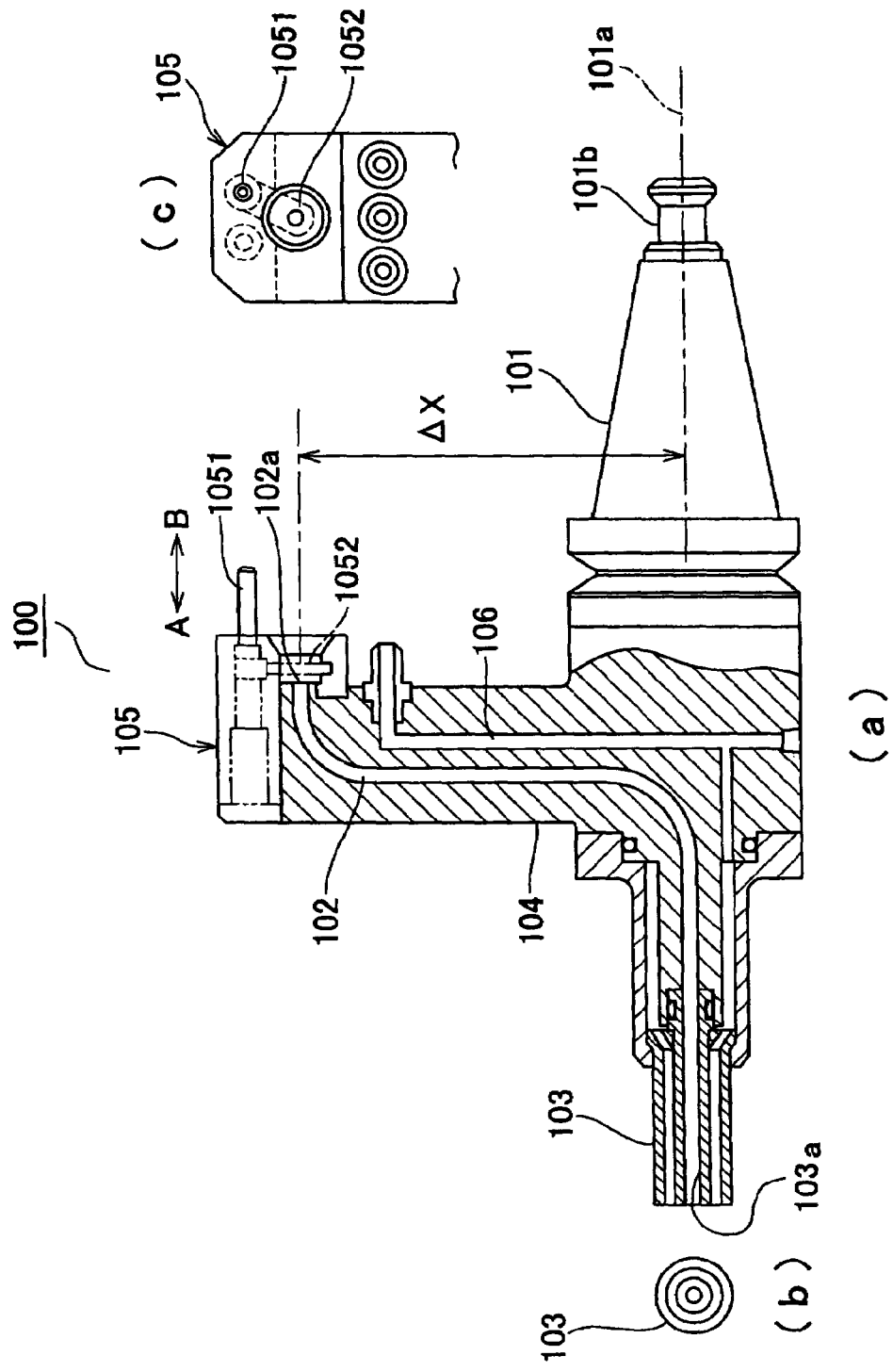
FIG. 1(a) is a partial sectional view showing a structure of a laser beam hardening tool according to the invention.
FIG. 1(b) is a side view showing a structure of a torch portion 103.
FIG. 1(c) is a side view showing a structure of a shutter means 105.

The end portions 102a, 112a (supply openings through which laser beam is supplied) of the beam guide paths 102, 112 may be located at positions offset with respect to the axis 101a of the engagement portion 101 (see a mark ΔX of FIGS. 1, 2). In such a structure, it is possible to avoid an interruption between the optical path for supplying the beam guide paths 102, 112 with laser beam (see a reference number 31 of FIG. 7) and the tool holding portion 202.

Preferably, a shutter means (reference number 105 in FIG. 1(a), 115 of FIG. 2(a) and 125 of FIG. 4) is located at an end portion of the beam guide path 102 or 112 in such a manner that an end portion 102a or 112a of the beam guide path 102 or 112 is opened so as to allow supply of laser beam when engaging the engagement portion 101 with the tool holding portion 202, and the end portion of the beam guide path 102 or 112 is closed so as to restrict attachment of foreign objects to the end portion or enter of foreign objects in the end portion when not engaging the engagement portion 101 with the tool holding portion 202. In case of a machine tool, oil mist generally floats in the air. The above-mentioned shutter means 105, 115, 125 are very proper for restricting attachment of oil mist to the beam guide path 102, 112 and enter of oil mist in the beam guide path 102, 112. And, power down of laser beam due to the presence of the foreign objects in the beam guide path can be avoided when using the laser beam hardening tool.

The shutter means may be one as shown in FIGS. 1(a) and (c), or as shown in FIG. 4.

The shutter means 105 as shown in FIGS. 1(a) and (c) is comprised of a rotationally movable axial portion 1051 and a shutter member 1052 attached to the axial portion 1051. When moving the axial portion 1051 in a direction as shown by arrows A and B, the shutter member 1052 selectively moves to a rotational position for opening the end portion of the beam guide path and a rotational position for closing the end portion of the beam guide path through a cam mechanism (not shown).

The shutter means 125 as shown in FIGS. 4(a), (b) and (c) is comprised of a shutter member 1251 movable to a closed position for closing the end portion of the beam guide path 112 (see FIGS. 4(a) and (c)) and an opened position for opening the end portion (see FIG. 4(b)), and a spring member 1252 for energizing the shutter member 1251 to the closed position. The shutter member 1251 is moved to the opened position against the spring member 1252 when engaging the engagement portion 101 with the tool holding portion 202, as shown in FIG. 4(b), and is moved to the closed position by an energizing force of the spring member 1252 when detaching the engagement portion 101 from the tool holding portion 202. The shutter member 1251 may be formed with a rubber plate having a restoring force, and may be held by a member 1253 having almost cylindrical shape. If the shutter means is structured as shown in FIG. 1 or FIG. 4, the members 1051, 1053 abut on the tool holding portion 202 so as to freely move the shutter members 1052, 1251 when attaching/detaching the laser beam hardening tool to/from the machine tool, so that an operation for moving the member 1251 is not necessary, thereby avoiding an error operation and never failing to operate.

Preferably, cooling paths 106, 116 in which fluid flows are formed near the beam guide paths 102, 112. In this case, heat generated due to passage of laser beam can be restricted. Fluid may be liquid (such as water) or gas. If the cooling path 106, 116 is opened at a position facing the workpiece W and gas is injected on the workpiece W, it is possible to remove foreign objects on a surface of the workpiece, to avoid oxidizing the workpiece, and to cool. In a case where a hardening with laser beam is performed after cutting machining, it is possible to remove water for cutting and cutting chips which remain on the surface of a workpiece, thereby improving a quality of machining with laser beam. When overheating the workpiece during a hardening, an efficiency of hardening reduces. In such a case, the workpiece is cooled with air purging so as to reduce decrease of the efficiency of hardening. If inert gas is used for gas, it is possible to shield a portion hardened.

FIG. 5 is a sectional view showing such state that the laser beam hardening tool 100 is installed in the machine tool, and a reference number A in the figure shows a laser beam generating unit for supplying the tool 100 with laser beam. The laser beam generating unit A has various kinds of structures. One instance of the structures is now explained, referring to FIGS. 6 through 13.

Figure 6:
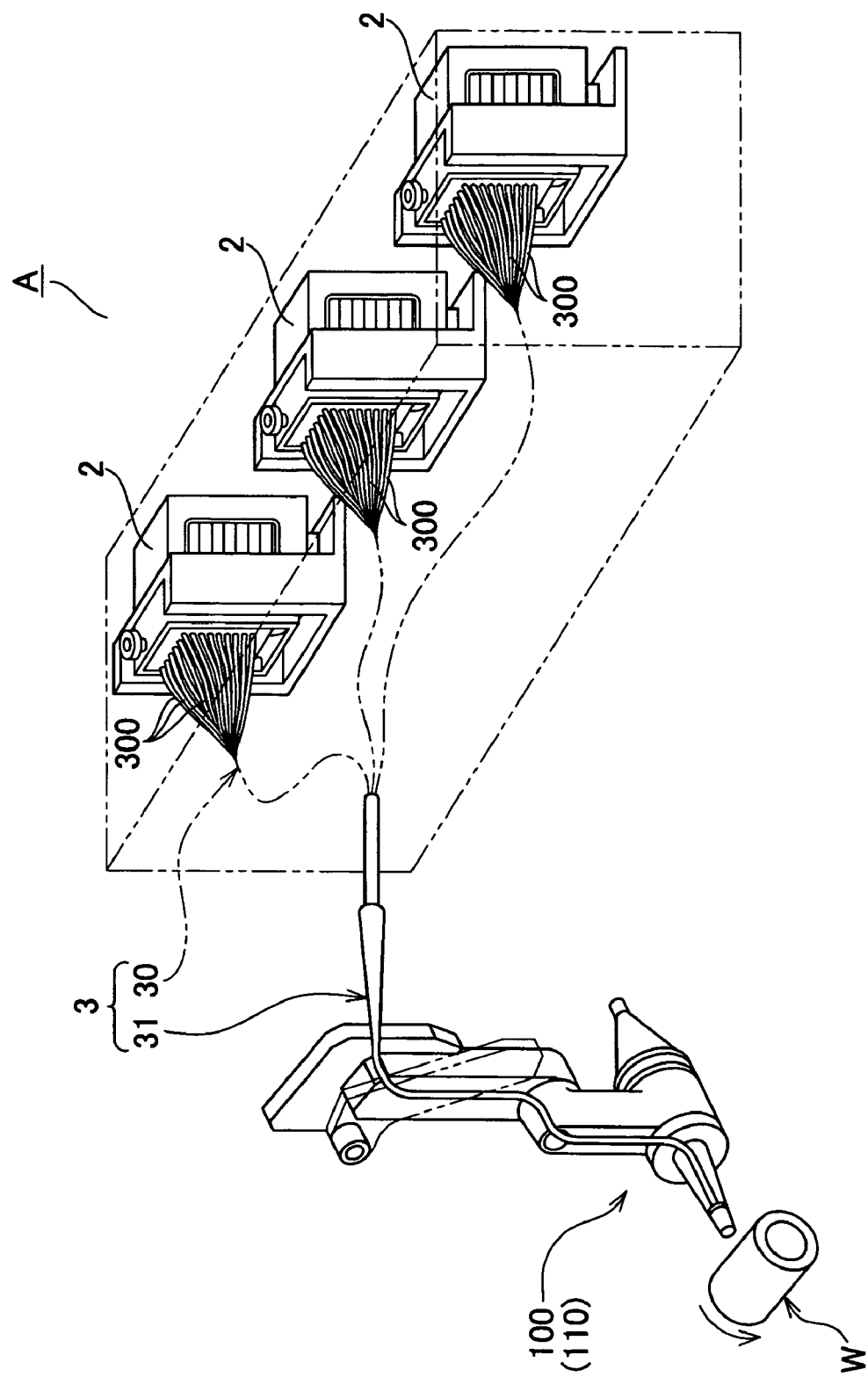
FIG. 6 is a perspective view showing a structure of laser beam generating units and a state of arrangement of the laser beam hardening tool.
Figure 7:
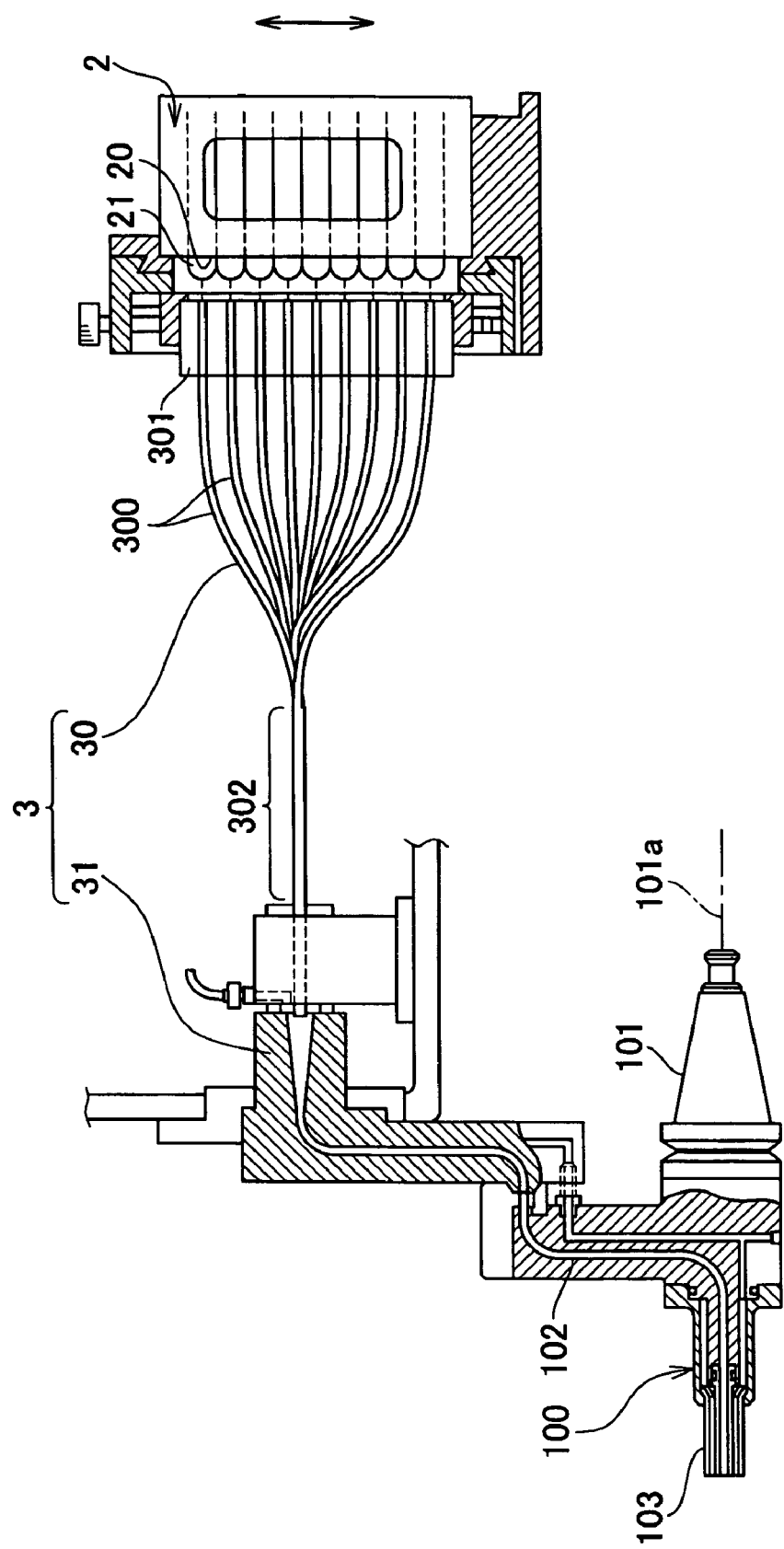
FIG. 7 is a partial sectional view showing a structure of the laser beam generating unit and a state of arrangement of the laser beam hardening tool.

This laser beam generating unit has a semiconductor laser beam source 2 for emitting laser beam, and a beam guide portion 3 which is a path for supplying the laser beam hardening tool 100 (or 110) with emitted laser beam, as shown in FIGS. 6, 7.

The semiconductor laser beam source 2 and the beam guide portion 3 are now explained in detail.

The semiconductor laser beam source 2 has a plurality of emitters 20 for emitting laser beam, as detailedly shown in FIG. 8. The laser beam source 2 may be "an array type" wherein the emitters 20 are arranged in a row or "a stack type" where in a plurality of the arrays are stacked. In FIG. 6, three semiconductor laser beam sources 2 are shown, but the number may be one, two, four or more. Such kind of the semiconductor laser beam source 2 is a semiconductor laser beam stacked array "Light Stack" made by Coherent Inc. of the U.S.A., for instance. The array may be comprised of nineteen (19) emitters (40 W) and twenty five (25) layers of arrays may be stacked so that a total number of the emitters is 19×25=475 (40 W×25 layers=1 kW). When using three of such a laser beam stack as shown in FIG. 6, the total number of the emitters is 475×3=1425 (1 kW×3=3 kW).

Preferably, the beam guide portion 3 has a first beam guide portion 30 comprised of a bundle of a plurality of optical fibers 300, and a second beam guide portion 31 located so as to pass laser beam from the first beam guide portion 30, as shown in FIG. 7. Preferably, each optical fiber 300 is located such that an end thereof faces the emitter 20 (see FIG. 8), and laser beam emitted from each emitter 20 is transmitted. Preferably, the end portion of each optical fiber 300 in a state of being embedded in a resin 301 is located, facing each emitter 20. Preferably, a microlens 21 (fast axis converging lens or slow axis converging lens) located between the end portion of the optical fiber 300 and the emitter 20 collects laser beam from the emitter 20 on an end face of the optical fiber 300. Preferably, a sheet shaped microlens is attached to the semiconductor laser beam source 2 with an adhesive or by soldering. The other ends of the optical fibers 300 may be bundled. Preferably, the number of the optical fibers 300 is the same as one of the emitters 20.

Preferably, the beam guide portion 3 has a taper optical path portion the cross sectional area of which is gradually reduced, so that laser beam from the semiconductor laser beam source 2 is raised in its power density in a process passing through said taper optical path portion and is radiated on the workpiece W.

Figure 9:
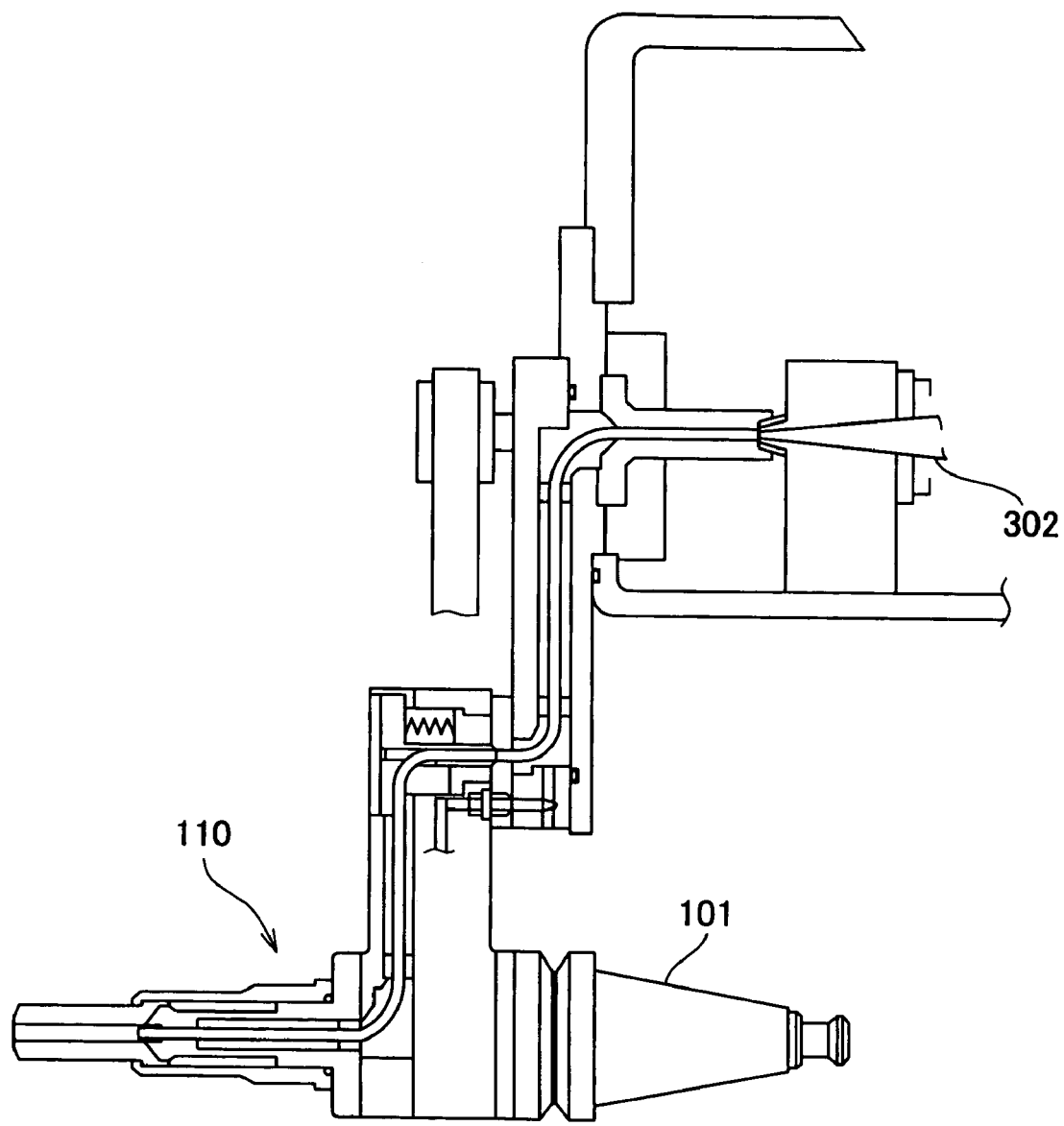
FIG. 9 is a partial sectional view showing a structure of an installation portion of the laser beam hardening tool.

Preferably, the optical fibers 300 of a bundle structure portion ("the bundle portion" hereinafter) in the first beam guide portion 30 are formed so as to have gradually reduced cross sectional area, and the thus formed optical fibers 300 are the taper optical path portion (see a reference number 302 of FIG. 9). If the number of the emitters 20 is 1425, the number of the optical fibers 300 is necessary to be also 1425. If a diameter of one optical fiber 300 is 250 μm, the bundle diameter is 250 μm×1425=φ 11 mm. If the diameter of one optical fiber 300 is 500 μm, the bundle diameter is 500 μm×1425=φ 22 mm. When the bundle diameter remains φ 11 mm or φ 22 mm, the power density of laser beam is not raised and then, a machining with laser beam can not be executed. Then, preferably, the cross section of the optical path of a bundle portion 302 is gradually reduced so that the bundle diameter becomes φ 4 mm through φ 5 mm, and 100 W/mm² of power density (2 kW of output) is obtained. A method of gradually reducing the cross sectional area of the optical path is that the end portion of each optical fiber 300 is processed so as to be tapered, and thereafter the optical fibers 300 thus processed are bundled, or a tapered fiber (see Japanese patent applications, Publication numbers are 2003-100123, 2003-75658 and 2002-289016) is used. FIG. 10(a) shows one fiber 300 before processing to be tapered, a reference number 300a is a clad, and a reference number 300b is a core. FIG. 10(b) shows the fiber 300 after machining so as to be tapered, and FIG. 10(c) shows a bundle structure comprised of the fibers after tapering machining. A reference number 303 denotes a clad newly coated.

Figure 11:
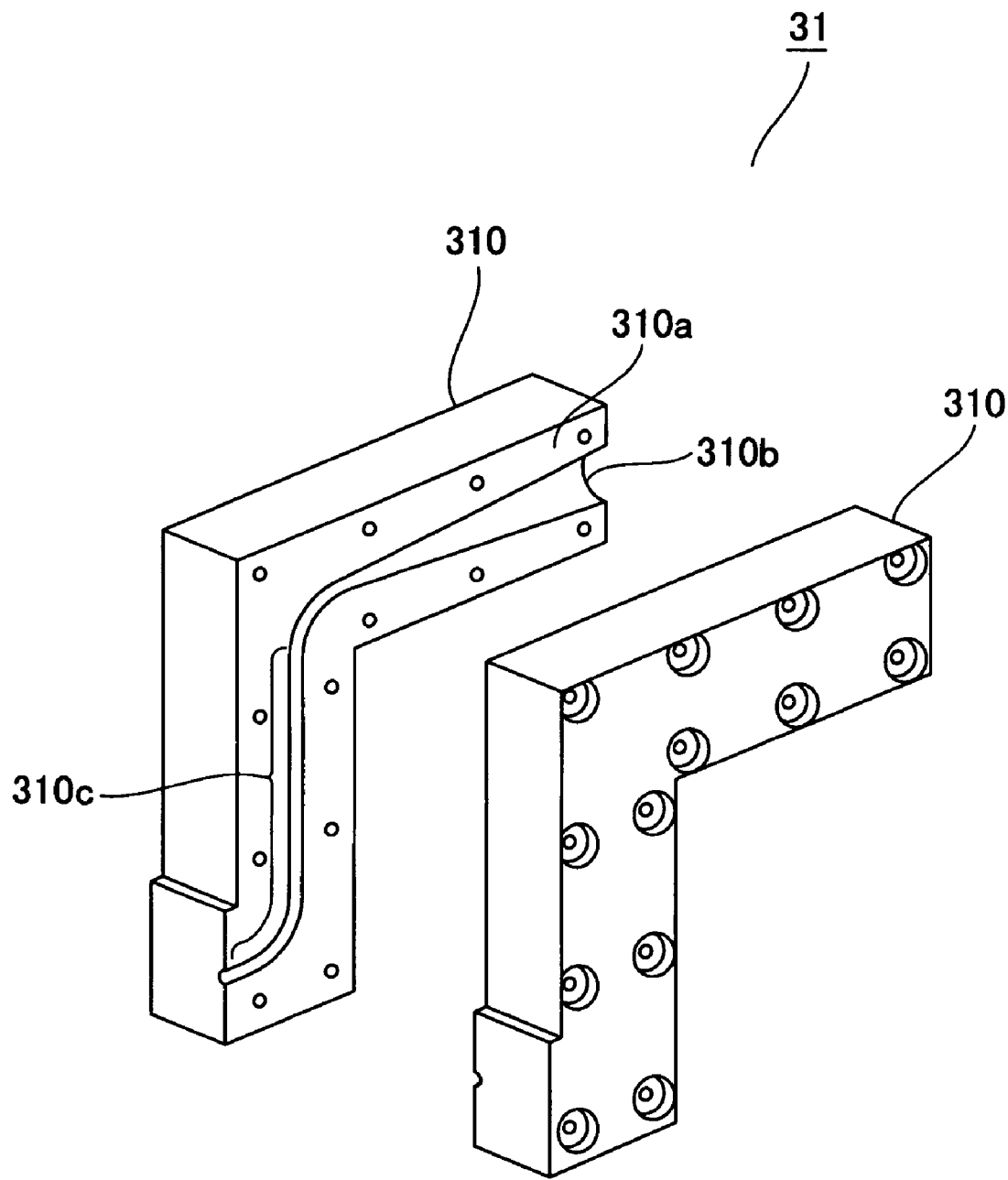
FIG. 11 is a perspective view showing a structure of an exploded second beam guide portion 31.

The taper optical path portion may be formed in the second beam guide portion 31, not in the first beam guide portion 30. Such method is that the tapered bundle portion as shown in FIG. 10(c) is not used for the first beam guide portion 30, but for the second beam guide portion 31, or the above-mentioned tapered fiber is not used for the first beam guide portion 30, but for the second beam guide portion 31, or a tapered path (solid path) is formed with member which transmits laser beam (beam guide member) (this method is not shown), or a tapered hollow path is formed inside a predetermined member ("the pass forming member" hereinafter) (see FIG. 11) Preferably, the path forming member is made of metal, such as aluminium. A method of forming the hollow path is that the path forming member is formed so as to divide into a plurality of the members 310, and a groove 310b is formed at a mating face 310a, as shown in FIG. 11. Preferably, mirror finish, lapping finish or metal coating is carried out on the portion of the groove 310b. A path (see a reference number 310c), the cross sectional area of which does not almost change, may be formed at the second beam guide portion 31 in order to only transfer laser beam. In the structure of FIG. 11, all paths can be formed by mechanical machining, and a glass or a lens as the beam guiding body is not necessary, so that it can be easily produced. Similar to a laser beam hardening tool, a path for cooling may be provided at the second beam guide portion 31, also.

Figure 12:
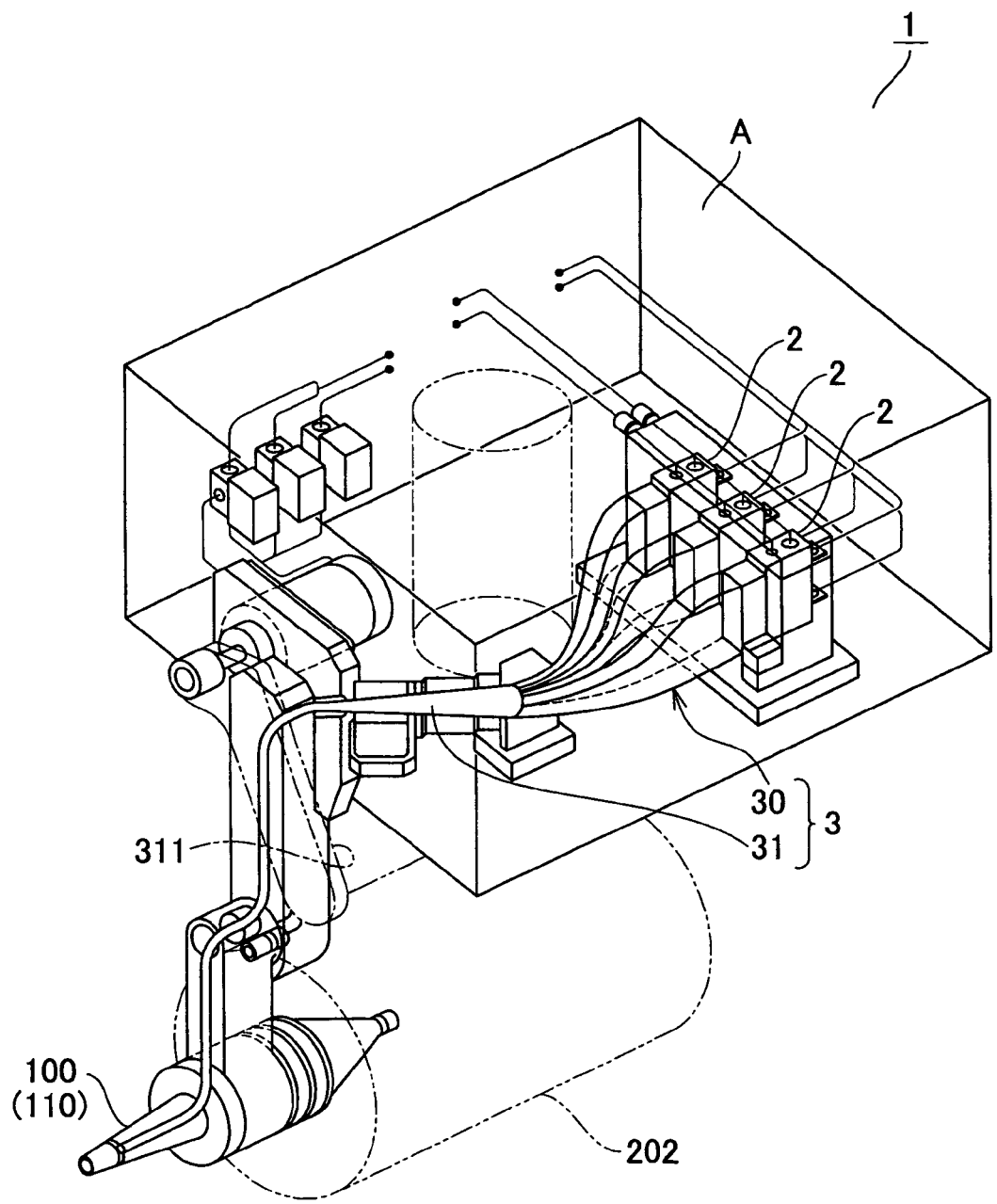
FIG. 12 is a perspective view showing the laser beam generating unit and the laser beam hardening tool.
Figure 13:
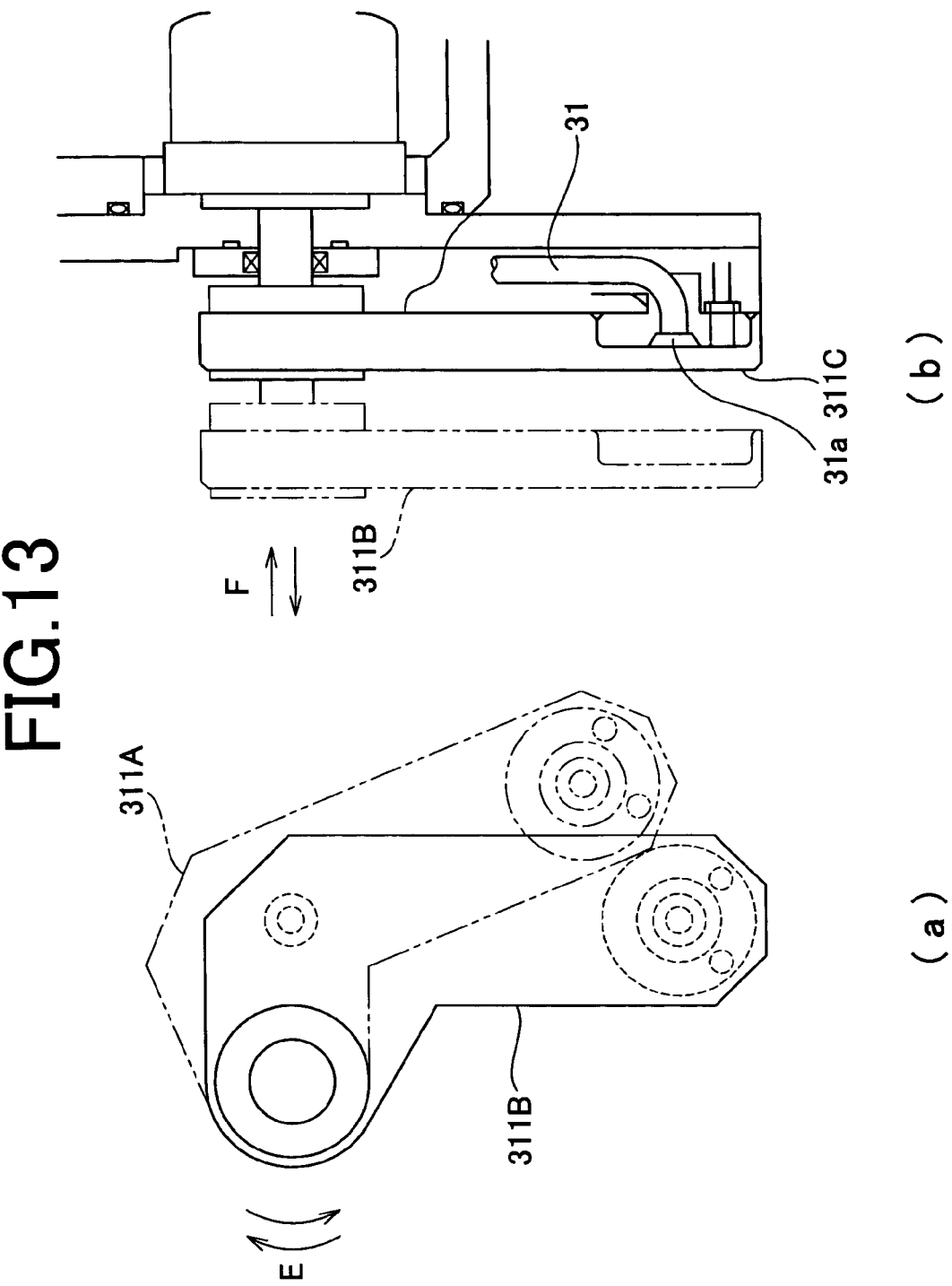
FIG. 13 is a view showing a closing mechanism of an opening end of the second beam guide portion 31.

As mentioned before, the laser beam hardening tool is free to be attached and detached. Then, it is necessary to close the opening end portion of the second beam guide portion 31 in order not to attach foreign objects, such as oil mist in the air, to the beam guide path or enter therein when detaching the laser beam hardening tools 100, 110. The structure formed in order to do so is shown in FIGS. 12, 13. A reference number of FIG. 13 can be rotationally moved as shown with E of FIG. 13(a), and can be moved in and out in an axial direction of a rotational axis as shown with F of FIG. 13(b). In a state of 311A, an opening end 31a of the second beam guide portion 31 is opened so as to connect the laser beam hardening tool. In a state of 311C moved from 311B, the opening end 31 is closed so as to prevent foreign object from being attached to the opening end 31a or entering therein.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. A laser beam hardening tool, comprising:
   an engagement portion capable of engaging with a tool holding portion of a machine tool;
   a beam guide path comprising a hollow passage defined within a path forming member, the hollow passage having an inner reflecting face such that a laser beam transmitted within said passage is reflected by said inner face; and
   a torch portion for radiating said laser beam which has passed through said beam guide path on a workpiece;
   wherein said beam guide path further comprises an internal corner portion;
   wherein a concave mirror is positioned at the corner portion for enhancing a power density of said laser beam and for outputting said laser beam to said torch portion; and
   wherein a path of said laser beam in said torch portion is tapered so as to have a gradually reduced cross section to enhance said power density.

2. The laser beam hardening tool according to claim 1, wherein an end portion of said beam guide path through which said laser beam is supplied is located at a position offset with respect to an axis of said engagement portion.

3. The laser beam hardening tool according to claim 1, further comprising shutter means for allowing said laser beam to be supplied by opening said end portion of said beam guide path when engaging said engagement portion with said tool holding portion and for restricting attachment of foreign objects to said end portion by closing said end portion of said beam guide path when not engaging said engagement portion with said tool holding portion.

4. The laser beam hardening tool according to claim 3, wherein said shutter means is comprised of a shutter member movable to a closed position for closing said end portion of said beam guide path, said shutter member further being movable to an open position for opening said end portion, and a spring member for energizing said shutter member to said closed position, wherein said shutter member is movable to said opened position against said spring member when engaging said engagement portion with said tool holding portion and is movable to said closed position by an energizing force of said spring member when detaching said engagement portion from said tool holding portion.

5. The laser beam hardening tool according to claim 1, further comprising a cooling path formed adjacent said beam guide path, said cooling path configured for fluid flow therein.

6. The laser beam hardening tool according to claim 5, wherein said fluid is gas, said cooling path is opened at a position facing said workpiece, and said laser beam hardening tool radiates said laser beam and expels gas onto said workpiece.

7. The laser beam hardening tool according to claim 1, further comprising a shutter unit for allowing laser beam to be supplied by opening said end portion of said beam guide path when engaging said engagement portion with said tool holding portion and for restricting attachment of foreign objects to said end portion by closing said end portion of said beam guide path when not engaging said engagement portion with said tool holding portion.

8. The laser beam hardening tool according to claim 7, wherein said shutter unit is comprised of a shutter member movable to a closed position for closing said end portion of said beam guide path, said shutter member further being movable to an open position for opening said end portion, and a spring member for energizing said shutter member to said closed position, wherein said shutter member is movable to said opened position against said spring member when engaging said engagement portion with said tool holding portion and is movable to said closed position by an energizing force of said spring member when detaching said engagement portion from said tool holding portion.

9. The laser beam hardening tool according to claim 7, further comprising a cooling path formed adjacent said beam guide path, said cooling path configured for fluid flow therein.

10. The laser beam hardening tool according to claim 9, wherein said fluid is gas, said cooling path is opened at a position facing said workpiece, and said laser beam hardening tool radiates said laser beam and expels gas onto said workpiece.

\* \* \* \* \*